July 23, 1946.  J. R. MEYERHOFF  2,404,648
ARTICLE FEEDING DEVICE
Filed May 3, 1943
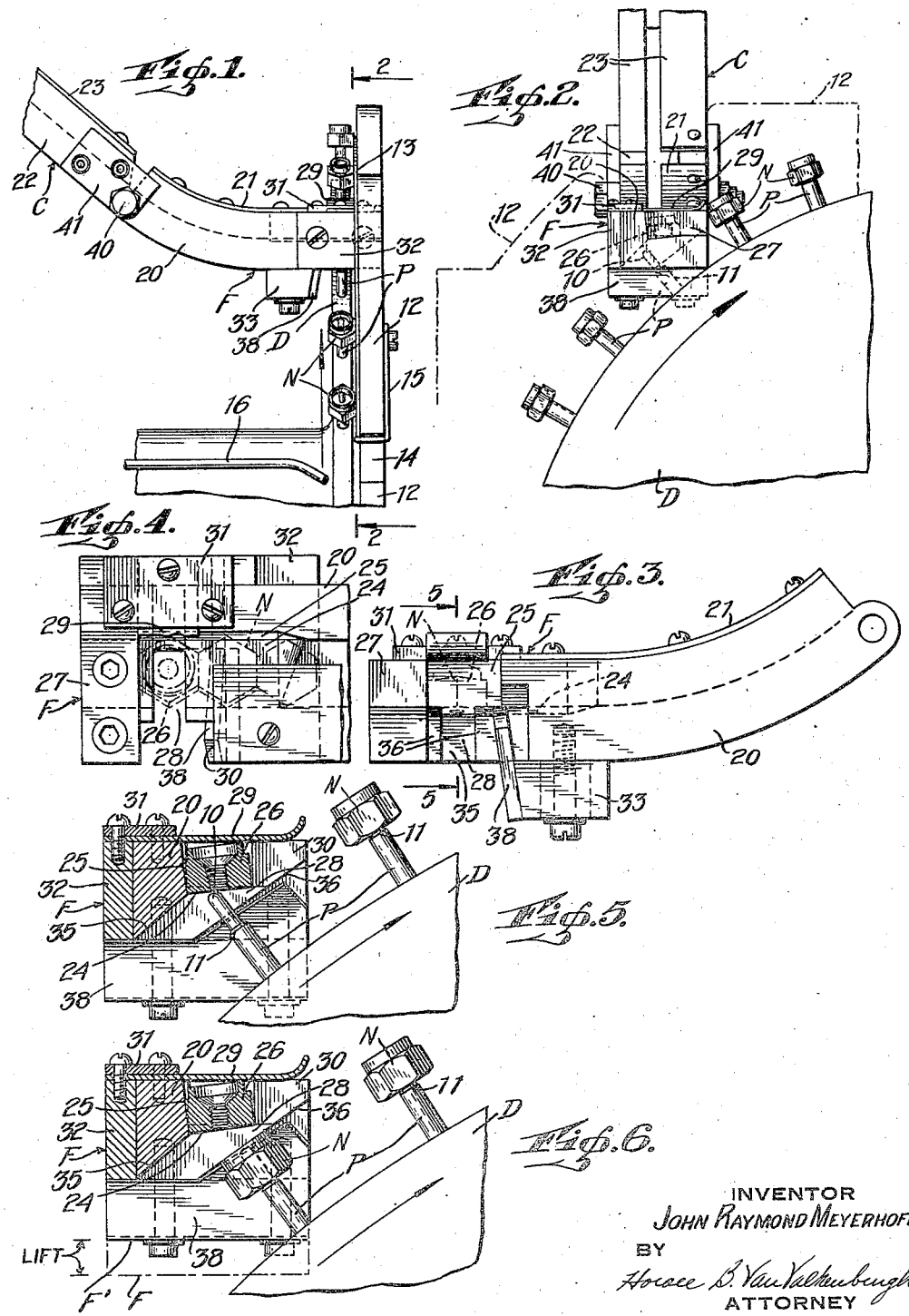
INVENTOR
JOHN RAYMOND MEYERHOFF
BY
Horace B. Van Valkenburgh
ATTORNEY Patented July 23, 1946

2,404,648

UNITED STATES PATENT OFFICE 2,404,648

ARTICLE FEEDING DEVICE

John Raymond Meyerhoff, Elizabeth, N. J., assignor to Elastic Stop Nut Corporation of America, a corporation of New Jersey Application May 3, 1943, Serial No. 485,471

3 Claims. (Cl. 51—215)

This invention relates to article feeding devices and more particularly to a device for feeding, either selectively or in succession, a plurailty of articles to article holders adapted to receive the same.

The principles of this invention have been applied to the feeding of hexagon-shaped or hex nuts to apparatus for grinding the sides of the nuts. Such apparatus includes a disc carrying about its periphery a plurality of radially extending pins. After a nut is placed on a pin, a pair of oppositely disposed grinding wheels grind two hex sides during the first revolution of the disc. The nut is then turned on the pin and an additional pair of oppositely disposed hex sides is ground during the next revolution of the disc. The nut is again turned and the third pair of hex sides is ground during a third revolution of the disc, after which the nut is discharged from the pin, leaving the pin empty.

Prior to this invention, a nut was placed on each empty pin by hand—an obviously tedious and tiresome job. One of the objects of this invention is to provide a feeding device which is capable of automatically placing nuts or the like upon the empty pins or studs of grinding apparatus as above. It will be evident that, to be effective, a feeding device must not only be capable of placing a nut on each empty pin, but also must be so constructed and arranged that a full pin will not cause a nut to be discharged from the feeding device, and it is a further object of this invention to provide a feeding device which will do so.

More general objects of this invention are to provide a feeding device for depositing a plurality of articles, selectively or in succession, at a predetermined place or places; to provide such a device which is capable of depositing a plurality of articles on pins or studs moving past the feeding device; to provide such a device which will selectively place an article upon only an empty pin or stud; and to provide such a device which is relatively simple in construction and has wide applicability. Other objects and the novel features of this invention will become apparent from the following description and accompanying drawing, wherein:

Fig. 1 is a front elevation of a feed device constructed in accordance with this invention for selectively feeding a plurality of nuts to apparatus for grinding the sides of the nuts;

Fig. 2 is an end elevation, on an enlarged scale, of the feed device of Fig. 1 and a portion of the grinding apparatus;

Fig. 3 is a rear view of the feed device;

Fig. 4 is a partial top view of the feed device;

Fig. 5 is a cross-section taken along line 5—5 of Fig. 3, illustrating the position of the feed device and pin just before a nut is placed on the pin by the feed device; and Fig. 6 is a cross-section similar to Fig. 5, illustrating the passage of a pin, already provided with a nut, past the feed device.

As in the drawing, a plurality of nuts N may be fed down a chute C to a feed device F, which is constructed in accordance with this invention and is adapted to deposit a nut on any empty pin P. Pins P extend radially from the periphery of a disc D, and as the disc rotates in the direction of the arrows of Figs. 1, 2, 5, and 6, the pins move past and/or through the feed device. If a pin is empty, it will receive a nut from the feed device, as it is just about to do in the position shown in Fig. 5. If a pin is provided with a nut, the feed device will merely tilt, as in Fig. 6, from the dotted position F upwardly to the full position F'.

In the grinding apparatus (only a portion of which is shown) the nuts are carried by disc D between a pair of spaced grinding wheels which rotate in a plane parallel to that of disc D and are disposed between 90° and 180° from the feed device, in the direction of rotation of the disc. As each nut comes between the grinding wheels, the opposite sides of the nut which are parallel to the disc are ground.

Each pin P includes a point 10 and a shoulder 11 on which the nut rests after the point enters the bore thereof. To keep the nuts from turning, a plate 12—which is disposed adjacent and parallel to disc D—is provided with a strip or guide 13 extending completely around the periphery of the disc, except for the space occupied by the grinding wheels, the feed device F, and a gap 14 through which a leaf spring 15 extends to turn the nuts through one hex, or 60°, at each revolution. Guide 13 prevents the nuts from turning as they move to and from the grinding wheel, except when the forward edge is caught by the end of spring 15, which is secured to plate 12 on the opposite side of disc D and extends through gap 14. As the front angle edge of each nut strikes spring 15, the nut is turned, but the amount of turn is limited to 60°, since one of the next sides to be ground immediately contacts guide 13 on the upper side of gap 14. Each nut pushes the spring back slightly, but as the nut moves the spring returns, to be in position for turning the next nut. Suitable means for removing every third or finished nut is provided, such as in intermittently operated air jet discharged from a tube 16, to blow each finished nut outwardly off the pin. As will be evident, along the upper periphery of the disc—above feed device F—every third pin will have a nut just placed thereon by the feed device, every third pin will have a nut with two sides ground, and every third pin will have a nut with four sides ground. Nuts with six sides ground will, of course, have been removed by the air jet.

The feed device F, constructed in accordance with this invention, includes a curved U-shaped lower block or channel 20, which, with a cover plate 21, forms a nut passage providing an extension of chute C, which, in turn, comprises a U-shaped channel 22, provided with a cover plate 23. Toward the end of channel 20, the bottom and one side of the passage are machined at a slight angle to provide surfaces 24 and 25, respectively, which cooperate to cause the nut to tilt slightly away from the outlet, as in Fig. 5, to keep the nut in proper position in the passage until an empty pin enters the bore. After moving into the channel 20 from chute C, which may be supplied with nuts from a selective hopper or in any other suitable manner, the nuts move—by gravity and through the weight of succeeding nuts—down the channel until the end nut, such as nut 26 of Fig. 4, contacts a block 27 which fits into and closes the end of the channel. Nut 26 is then resting on a ledge formed on either side of a transverse slot or passage 28 in channel 20, through which a pin P moves until it reaches the nut, as in Fig. 5. As the pin enters the bore of the nut, the nut slides along the ledge and falls and/or is pushed onto the pin by a spring 29, which extends out over the channel, and over a nut slot or transverse passage formed between an end wall 30 of the rear leg of the channel and end block 27.

More specifically, as the pin enters the bore of the nut, it first tilts the nut further, so that the upper edge of the nut contacts spring 29, which, as it is lifted slightly, begins to push the nut down onto the pin. As the nut slides along and the spring is lifted a greater amount, a greater force is exerted against the nut, pushing it firmly down onto the pin. In addition, the feed device may be so placed, along an upward portion of the travel of the periphery of disc D, that the pin rotates relatively to the feed device as it is entering the nut. This also assists in causing the nut to slide more readily onto the pin.

Spring 29 may be clamped in position by a cap 31, secured by suitable means, such as a cap screw as shown, to the front leg of channel 20 and to a side leg 32 of a bracket 33. End block 27, cover plate 21, and bracket 33 also may be attached to channel 20 in any suitable manner, as by bolts or cap screws.

Slot 28 is sufficiently wide to accommodate a pin P, but not one of the nuts, and inner edge 35 of the slot provides sufficient clearance for the top of each pin as it comes around, as in Fig. 5. Channel 20 is also machined to provide an angular shoulder 36 extending outwardly from the lower edge of slot 28. When a pin already provided with a nut moves up beneath the feed device, the top of the nut will first contact the bottom of the channel, and slide along the same to raise the feed device from the position F to the position F' of Fig. 6. Since the nut cannot enter slot 28, it then merely slides along shoulder 36 until the end of the shoulder is reached, whereupon the feed device drops back. If the next pin is provided with a nut, the feed device will again be lifted, but if the pin is empty, it will extend through slot 28 into the bore of the nut, and a nut will be pushed onto the pin as before.

To prevent the nut from turning while the feed device is lifted, an inclined guide plate 38 is mounted on bracket 33, being attached thereto in any suitable manner, as by welding. A nut moving out of the device on a pin will, of course, be prevented from turning by end wall 30 and the inner surface of end block 27, until it reaches guide strip 13 on plate 12. However, when the feeding device is lifted by a nut already on a pin, such a nut does not contact the above surfaces. Such a nut is prevented from turning, between the time it leaves and again contacts guide strip 13, by plate 38, the inclination of which compensates for movement of the plate toward such a nut as the feed device pivots during lifting.

The feed device is attached at its rear end to chute C by a pin or bolt 40, about which it also pivots. Bolt 40 passes through suitable holes in channel 20 and a pair of plates 41, which are suitably attached to channel 22 of the chute. Plates 41 form guides for the channel 20 in its upward and downward movements, while a portion of chute channel 22 may be cut away, as in Fig. 1, to provide clearance for channel 20 of the feed device.

Since neither the pin nor the nut can enter the slot, when a nut is on a pin, the position of the last nut in the feed device is rarely disturbed. Furthermore, the inclination of surfaces 24 and 25 prevent a nut from slipping forwardly in the channel. If the nut slid forwardly, the next empty pin would tend to strike the rear of the nut and knock it out of the feed device.

From the foregoing it will be evident that this invention provides a feeding device for a plurality of articles, which is relatively simple in construction, yet feeds articles accurately and uniformly to pins or the like adapted to receive the same. It will also be evident that this invention, particularly the embodiment thereof described herein, provides a device which selectively feeds a plurality of articles to apparatus wherein only a portion of the pins are empty. However, it will be understood that the principles of this invention are applicable to devices for feeding other types of apparatus, such as nut separating devices and the like. Thus, it will be understood that the invention may be embodied in a device for feeding apparatus having pins or other parts for receiving the articles, all of which are normally empty. (In the latter case, it may be unnecessary to provide a pivot for the feed device.)

It will be understood that various changes may be made, such as in the shape of the channel or the relative position of the feed device with respect to the remainder of the apparatus; that the device may be utilized to feed articles other than nuts; and that such articles may be solid, in which case fingers or the like may grasp each article on two sides. It will be further understood that other changes are possible without departing from the spirit and scope of this invention, as defined in the appended claims.

What is claimed is:

1. A device for feeding a plurality of articles to a succession of extending article holders moving along a predetermined path, said device having a longitudinal article passage disposed at an angle to the path of movement of said holders, a lateral passage through which at least a portion of a holder is adapted to pass, and a shoulder adapted to be contacted by an article already on a holder, to prevent said holder from entering said lateral passage.

2. Apparatus comprising a plurality of pins mounted on a revolving disc and adapted to enter the bore of a nut; a downwardly inclined chute for said nuts; and a feeding device forming a longitudinal extension of said chute and disposed at an angle to the path of movement of said pins, said device extending to a point in the path of movement of said pins at which said pins are moving upwardly; said device being supported by and pivoted on said chute; said device having a substantially horizontal longitudinal passage connecting with said chute, the exit section of said passage being inclined to cause a nut to tilt away from the exit end of a lateral passage through which at least the end of each pin is adapted to pass to enter the bore of a nut in the exit section of said longitudinal passage; a leaf spring pivoted at one side of the exit section of said longitudinal passage and extending laterally across the exit section of said longitudinal passage; said device also having a shoulder below said lateral passage and against which a nut already on a pin will ride to lift the pivoted feed device, but an empty pin will extend into the lateral passage to enter the bore of a nut in the exit section of said longitudinal passage; and an inclined guide plate below said shoulder for guiding a nut while said feeding device is lifted.

3. In a device for feeding a plurality of articles to a succession of article holders moving along a predetermined path, conduit means providing an article passage having a terminus adjacent to said path, means for pivotally mounting said conduit at a point spaced from said terminus, a slot in said conduit through which at least a portion of a holder is adapted to pass, and a surface on said conduit located so as to be contacted by an article already on a holder to pivot said conduit away from the holder to thereby prevent the holder from entering said slot.

JOHN RAYMOND MEYERHOFF.